United States Patent [19]
Yamamoto et al.

[11] Patent Number: 5,647,206
[45] Date of Patent: Jul. 15, 1997

[54] EXHAUST EMISSION PURIFICATION APPARATUS

[75] Inventors: Takahiko Yamamoto, Nagoya; Hiroshi Mori, Ichinomiya; Masakazu Tanaka, Okazaki; Makoto Saito, Nishio; Mamoru Mabuchi, Kariya, all of Japan

[73] Assignee: Nippondenso Co., Ltd., Kariya, Japan

[21] Appl. No.: 493,505

[22] Filed: Jun. 22, 1995

[30] Foreign Application Priority Data

Jun. 27, 1994 [JP] Japan .................................. 6-144510

[51] Int. Cl.$^6$ .................................................. F01N 3/28
[52] U.S. Cl. .................. 60/297; 60/279; 60/284; 60/296
[58] Field of Search ........................ 60/284, 296, 297, 60/279

[56] References Cited

U.S. PATENT DOCUMENTS

| | | | |
|---|---|---|---|
| 4,934,142 | 6/1990 | Hayashi | 60/297 |
| 5,125,231 | 6/1992 | Patil et al. | 60/297 |
| 5,307,627 | 5/1994 | Christensen | 60/297 |
| 5,388,405 | 2/1995 | Fujishita | 60/297 |

FOREIGN PATENT DOCUMENTS

| | | |
|---|---|---|
| 588315 | 3/1994 | European Pat. Off. . |
| 159716 | 7/1987 | Japan .................... 60/279 |
| 3 59418 | 6/1991 | Japan . |
| 3194113 | 8/1991 | Japan . |
| 4 17710 | 1/1992 | Japan . |
| 4311618 | 11/1992 | Japan . |
| 5 44446 | 2/1993 | Japan . |

OTHER PUBLICATIONS

Heimrich, et al: "Cold–Start Hydrocarbon Collection for Advanced Exhause Emission Control", SAE Paper 920847, pp. 1–12.

*Primary Examiner*—Douglas Hart
*Attorney, Agent, or Firm*—Cushman, Darby & Cushman IP Group of Pillsbury Madison & Sutro LLP

[57] ABSTRACT

To be able to efficiently and rapidly reduce noxious exhaust gas components after starting of an engine without impeding activation of a catalyst device, and moreover to be able to perform rapid separation of noxious exhaust gas components, an adsorption device 5 for adsorbing noxious exhaust gas components is provided downstream of a catalyst device constituting a main mode of operation of exhaust-gas purification, a honeycomb body carrying adsorbent is disposed within the adsorption device, a bypass passage is formed to one side of the honeycomb body, and a switching valve is provided upstream of those components. After engine starting, the switching valve opens, exhaust gas flows in the passage on the honeycomb body side, and HC is adsorbed by the adsorbent. Meanwhile, when exhaust-gas temperature rises and a condition wherein HC separates from the adsorbent is reached, the switching valve is closed, adsorption components which have become high in temperature due to exhaust gas heat separate from an passage between the downstream of this switching valve and the honeycomb body, and are refluxed via reflux passages and to an upstream side of the foregoing catalyst device.

18 Claims, 3 Drawing Sheets

EXHAUST EMISSION PURIFICATION APPARATUS

CROSS REFERENCE TO RELATED APPLICATION

This application is related to and claims priority from Japanese Patent Application No. Hei. 6-144510, incorporated herein by reference.

BACKGROUND OF THE INVENTION

1. Field of the Invention

The present invention relates to an exhaust-emission purification apparatus of an engine (internal combustion engine) mounted in an automobile or the like.

2. Description of Related Art

An exhaust-emission purification apparatus employing a carrier carrying a noble metal (e.g., platinum, rhodium, and so on) or the like is known as a purification apparatus to purify exhaust gas of an automotive engine. To purify noxious exhaust-gas components utilizing such a noble-metal catalyst, it is generally considered to be necessary that the temperature of the catalyst rise to 350° C. or more, which is an activation temperature.

Immediately after engine starting, however, the catalyst has not reached the activation temperature, and so a problem exists whereby noxious exhaust-gas components of hydrocarbons (hereinafter abbreviated as "HC") and the like remain essentially unpurified and are emitted from the automobile.

In this regard, Japanese Patent Laid-Open Publication No. Hei 4-17710 provides a catalytic apparatus in an emissions system of an engine which includes a bypass passage in a downstream side thereof, and disposes in this bypass passage an adsorption device having an adsorbent to adsorb noxious exhaust-gas components which cannot be purified by the catalyst device when cold-staring the engine.

According to this device, a switching valve is disposed on a downstream side of the adsorption device for noxious exhaust-gas components, and along with this, the passage between this adsorption device and the switching valve is communicated to an intake side of an engine by an exhaust reflux passage, and moreover HC adsorbed by the adsorption device is separated at a downstream side thereof by the switching valve by opening the exhaust reflux passage, so that the separated HC is refluxed through the exhaust reflux passage to the intake side of the engine.

Herein, adsorption conditions of favorable efficiency are generally obtained when adsorption-component concentration in ambient gas is high and temperature is low, whereas rapid separation conditions are obtained when the absorption (separation) component concentration in ambient gas is low and temperature is high.

However, according to the foregoing Japanese Patent Laid-Open Publication No. Hei 4-17710, because the above-described structure causes noxious exhaust-gas components such as HC to separate at the downstream side of the adsorption device irrespective of whether a large amount of these noxious exhaust-gas components such as HC have been adsorbed in the upstream side of the adsorption device, a significant amount of time is required for the separation of noxious components.

Furthermore, because the adsorption device is disposed in the bypass passage of the main exhaust gas passage, assuming a structure wherein it is difficult for heat of exhaust gas flowing through the main exhaust gas passage to be transmitted to the adsorption device during the separation of noxious components, the temperature of the adsorbent does not rise during separation, and still more time is required for the separation of noxious components.

Additionally, a switching valve is provided in the downstream side of the adsorption device, and so the possibility also exists that when particulates and the like in the exhaust gas adhere to the switching valve and the sealing performance of the switching valve during opening and closing deteriorates, noxious components which have separated from the adsorption device will pass unaltered through the main exhaust passage and be released into the atmosphere.

Moreover, according to Japanese Patent Laid-Open Publication No. Hei 5-44446, the direction of gas flow in the interior of the adsorbent is reversed during adsorption of HC and the like and during separation of HC and the like, and separation of HC and the like from the adsorbent is performed. However, because the atmosphere is utilized as the gas used in separation, there exists the problem whereby the adsorbent is cooled, rapid separation conditions of HC are not fulfilled, and much time is required for separation.

Furthermore, according to Japanese Utility Model Laid-Open Publication No. Hei 3-59418 as well, the direction of gas flow is reversed during HC adsorption and during separation, but because exhaust gas purified by the catalyst is utilized as the gas used in separation, the temperature of the adsorbent becomes high and separation time can also be shortened.

However, because this apparatus has a complex exhaust-passage structure on an upstream-side portion of a catalyst device which constitutes a main mode of operation of exhaust purification, the amount of exhaust heat needed to cause the temperature of the catalyst device to rise is correspondingly insufficient, the temperature rise of the catalyst device which constitutes the main mode of operation is delayed, and activation of the catalyst is not performed rapidly.

SUMMARY OF THE INVENTION

In light of the above-described problems, it is an object of the present invention to provide an exhaust-emission purification apparatus which can favorably reduce noxious exhaust gas components without hindering catalyst activation immediately after engine starting, wherein a pressure relationship within an exhaust passage acts in a direction of enhancing sealing performance with respect to a passage-switching device, and moreover which can perform rapid separation of noxious exhaust gas components with no discharge into the atmosphere of adsorbed noxious exhaust gas components even in a case where sealing performance of this switching device has deteriorated due to deposition of particulates in exhaust gas or thermal deformation.

To achieve the foregoing object, the present invention disposes an adsorbent-structure body to adsorb noxious exhaust-gas components downstream of a catalyst device which constitutes a main mode of operation of exhaust-emission purification, and along with this, provides a switching unit upstream of this adsorbent-structure body to cause components which have separated from the adsorbent which has been heated to a high temperature by exhaust gas to be refluxed to an upstream side of the catalyst device from between upstream of this adsorbent-structure body and downstream of the switching unit.

Because of the above-described technical features, the switching unit causes exhaust gas to flow to the passage of the adsorbent-structure body and the exhaust gas can be adsorbed by the adsorbent of the adsorbent-structure body even if noxious components in the exhaust gas are not purified by the catalyst device immediately after starting of an engine, and so noxious exhaust gas components generated in exhaust gas immediately after engine starting can reliably be eliminated.

Meanwhile, after engine warmup the catalyst device has been activated, and adequate purification of exhaust gas can be achieved with the mode of operation of this catalyst device. At that time, the switching unit causes exhaust gas to flow to the bypass passage and exhaust gas dose not flow to the passage of the adsorbent-structure body, but because the bypass passage is formed adjacently to the adsorbent-structure body, the exhaust-gas heat of the bypass passage is conveyed to the adsorbent-structure body and the adsorbent is maintained at a high temperature, and so during noxious-component separation after engine warmup the separation action thereof can be promoted, and separation of noxious components can be completed rapidly and in a short time.

Moreover, because separation components are refluxed from an upstream side of an adsorbent in which a large quantity of noxious components is adsorbed to the reflux passages, separation components of high concentration can be refluxed to the reflux passages immediately, and for this reason separation of noxious components can be completed still more rapidly.

Accordingly, because the above-described separation components are refluxed upstream from the activated catalyst device via the reflux passages, they are purified still more favorably by this catalyst device.

Furthermore, because there is no need whatsoever to provide a complex exhaust-passage structure upstream of the catalyst device, the temperature of the catalyst device can be caused to rise rapidly after engine starting, and there is no chance of losing purifying action due to the catalyst device.

Additionally, because reflux of separation components is performed by disposing the switching unit on an upstream side of the adsorbent and blocking the upstream-side passage of the adsorbent with the switching unit, the pressure relationship within the exhaust passage enhances sealing performance with respect to the switching unit, and no adsorbed noxious exhaust-gas components will be discharged into the atmosphere even in a case where sealing performance of this switching unit may have deteriorated due to deposition of particulates in exhaust gas or thermal deformation.

In addition to the above-described mode of operation and effects, in the invention according to the first claim, separation components are refluxed at the upstream side of the activated catalyst device via the reflux passages and to an exhaust gas side of the engine, and the reflux of the separation components has no effect whatsoever on combustion control of the engine.

Additionally, the intake-air vacuum of the engine can be utilized for reflux of separation components to the reflux passage side, and so the structure of the device can be simplified.

BRIEF DESCRIPTION OF THE DRAWINGS

Other objects, features and characteristics of the present invention as well as the functions of related parts will become more clear from a study of the following detailed description, the appended claims, and the drawings. In the accompanying drawings:

DETAILED DESCRIPTION OF THE PREFERRED EMBODIMENTS

Embodiments according to the present invention will be described hereinafter with reference to the drawings.

Figure 1:
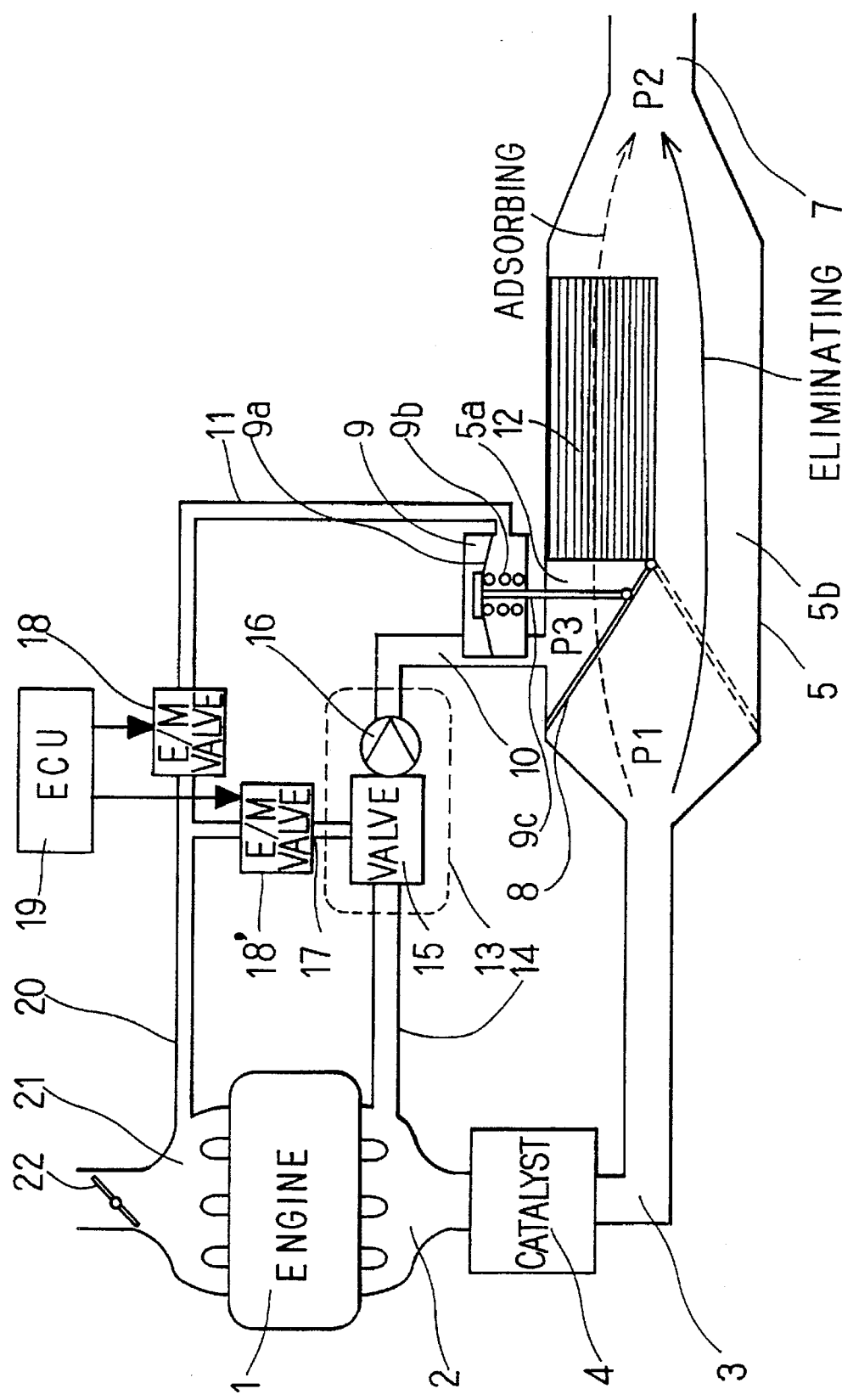
FIG. 1 is an overall system structural diagram of an exhaust-emission purification apparatus according to a first embodiment of the present invention.

FIG. 1 indicates one embodiment according to the present invention in an exhaust-emission purification apparatus of an engine for automotive use. In FIG. 1, an exhaust manifold 2, catalytic converter (hereinafter catalyst device) 4, exhaust pipe 3, adsorption device 5, and exhaust pipe 7 are sequentially connected in series in an emissions system of an engine 1 of an automobile, in sequence from the engine 1. Herein, the catalyst device 4 has a carrier of honeycomb configuration composed of cordierite carrying a three-way catalyst having one or more noble metals such as platinum and rhodium as main compositions in the interior thereof.

Meanwhile, according to the present invention the adsorption device 5 targets HC noxious components in the exhaust gas, and the adsorption device 5 internally uses a honeycomb body 12 of cordierite fabrication carrying hydrophobic zeolite as the adsorbent-structure body. Herein, the hydrophobic zeolite has high heat resistance of approximately 700° to 800° C.

Additionally, the honeycomb body 12 may be fabricated of only hydrophobic zeolite itself, and it is also acceptable to utilize as the adsorbent another material other than hydrophobic zeolite, for example, activated charcoal. Furthermore, it is also acceptable to employ an adsorbent which targets noxious components in exhaust gas which are not HC but instead are NOx, CO, or the like. For example, an adsorbent taking an alkaline-earth metal as a main ingredient is preferred as an NOx adsorbent.

In the adsorption device 5, a passage 5a provided with the honeycomb body 12 occupies a portion (substantially half) of the exhaust gas passage, whereas a bypass passage 5b containing a flow of exhaust gas which does not pass through the honeycomb body 12 is formed to one side of the honeycomb body 12. Accordingly, a switching valve 8 to switch and select the passage 5a or bypass passage 5b of the honeycomb body 12 is installed immediately upstream of the honeycomb body 12. The switching valve 8 is driven by an actuator (valve-drive unit) 9 to select one of the foregoing passages 5a and 5b.

According to the present invention, the actuator 9 has a pressure-responsive member 9a such as a diaphragm, bellows, or the like operated by an intake vacuum of the engine 1 which is applied via air-intake pipes 11 and 20, as well as a spring 9b and a shaft 9c. Displacement of the pressure-responsive member 9a is transmitted to the switching valve 8 via the shaft 9c to open and close the switching valve 8. The adsorption device 5 is interconnected by a bonding method such as welding.

Aside from the foregoing switching valve 8, a switching valve may be added as required on the downstream side of the honeycomb body 12 as well to reliably obstruct discharge of separated HC to the exhaust pipe 7 during HC separation by closing the downstream side of the honeycomb body 12 as well.

Meanwhile, recirculation passages 10 and 14 to recirculate HC separated from the honeycomb body 12 to the exhaust manifold 2 upstream of the catalyst device 4 are attached in locations between an upstream-side location of the honeycomb body 12 and the switching valve 8, and a switch valve 15 and one-way valve 16 are provided between these recirculation passages 10 and 14. The switch valve 15 is opened and closed by a pressure-responsive member such as a diaphragm, bellows, or the like operated by an intake vacuum of the engine 1 applied via air-intake pipes 20 and 17. In addition, the one-way valve 16 is repeatedly opened and closed intermittently by exhaust-gas pulsations of the engine 1 applied via the recirculation passage 14 when this switch valve 15 is open, allowing only one-way flow from the upstream side of the honeycomb body 12 to the upstream side of the catalyst device 4.

The air-intake pipe 20 is connected to an intake manifold 21 of the engine 1, and a throttle valve 22 is installed upstream of this intake manifold 21. Additionally, solenoid valves 18 and 18' are respectively installed in the air-intake pipes 11 and 17, and these solenoid valves 18 and 18' are related to the exhaust gas temperature status of the engine 1 by a control unit 19 having an internal microprocessor to control opening and closing thereof.

A mode of operation of the present embodiment according to the above-described structure will be described next with reference to the flowchart in FIG. 2. When an ignition switch of the engine 1 is switched on and the engine 1 starts, the microprocessor of the control unit 19 starts (S1), and subsequently, after performing initialization processing (S2), in S3 the solenoid valve 18 is opened by the control unit 19.

Because the air-intake pipes 11 and 20 are connected by the opening of this solenoid valve 18, vacuum flow the intake manifold 21 is applied to the pressure-responsive member 9a of the actuator 9 via the air-intake pipes 11 and 20, causing this pressure-responsive member 9a to be displaced downwardly and causing the shaft 9c to be moved downwardly, and so the switching valve 8 assumes the valve-open position indicated by the broken lines.

Because the solenoid valve 18' is closed at this time, engine intake vacuum is not supplied to the to the switch valve 15, and the switch valve 15 remains closed.

Herein, immediately after starting of the engine 1, exhaust gas temperature is low and the engine 1 discharges exhaust gas containing large amounts of HC, but in the interval during which the exhaust-gas temperature is low the catalyst of the catalyst device 4 does not reach activation temperature, and so HC is essentially unpurified and flows through the exhaust pipe 3.

Because the switching valve 8 of the adsorption device 5 is operated in the valve-open position of the foregoing broken lines, this exhaust-gas flow passes through the passage 5a and flows through the honeycomb body 12 carrying adsorbent composed of hydrophobic zeolite, and HC is adsorbed by the adsorbent. Consequently, exhaust gas after HC has been eliminated is released from the exhaust pipe 7 through a muffler (not illustrated) to the atmosphere. At this time, the higher the concentration of HC the higher is the adsorption efficiency of HC to the adsorbent, and so the degree of HC adsorption on the honeycomb body 12 yields a larger amount of adsorption of HC farther upstream of the honeycomb body 12.

Accordingly, as the time t after engine starting elapses and warmup of the engine 1 progresses, the exhaust-gas temperature rises. When the time t surpasses a predetermined time ta which of the HC-adsorbable temperature of the adsorbent (in other words, a predetermined time ta in which adsorption speed and separation speed at the adsorbent become equalized and a temperature at which separation of HC from the adsorbent begins is reached) elapses, that is to say, when t >ta, the decision at S4 becomes YES, and execution passes to S5 and the solenoid valve 18 is closed by a signal from the control unit 19.

Because of this, the supply of vacuum to the pressure-responsive member 9a of the actuator 9 is interrupted, the pressure-responsive member 9a is returned to its original position by the resilience of the spring 9b, and the switching valve 8 assumes the valve-closed position indicated by solid lines.

Consequently, the passage within the adsorption device 5 is switched, and exhaust gas flows through the bypass passage 5b not provided with the honeycomb body 12. Because the catalyst of the catalyst device 4 reaches activation temperature at this time, HC in the exhaust gas is purified by the catalyst device 4, and exhaust gas containing essentially no HC passes through the bypass passage 5b not provided with the honeycomb body 12 and is released into the atmosphere.

Immediately after the solenoid valve 18 closes in S5, subsequently in S6 the solenoid valve 18' is opened by a signal from the control unit 19. Because of this, the air-intake pipes 17 and 20 are connected, vacuum is supplied from the intake manifold 21 to the switch valve 15, and the switch valve 15 opens.

Meanwhile, due to exhaust gas which flowing through the bypass passage 5b within the adsorption device 5 has already reached a high temperature, the high heat of the exhaust gas in this bypass passage 5b is transmitted directly to the honeycomb body 12 and the temperature of the adsorbent rises, and so separation of HC from the adsorbent can be promoted. Because the switch valve 15 is open in the foregoing manner at this time, exhaust-gas pulsations generated within the exhaust manifold 2 are applied to the one-way valve 16 via the recirculation passage 14, and this one-way valve 16 is intermittently opened.

Because of this, HC which has separated from the adsorbent of the honeycomb body 12 flows into the exhaust manifold 2 via the recirculation passages 10 and 14, and so is purified by the catalyst device 4 together with HC in exhaust gas from the engine 1. Herein, as described above, the farther upstream of the honeycomb body 12, the larger the amount of HC adsorbed in the adsorbent of the honeycomb body 12, and so there is essentially no outflow of this adsorbed HC to exhaust gas passing through the bypass passage 5b from a downstream open end of the honeycomb body 12.

The pressure relationship of this adsorption device 5 in this HC-separation state will be described in greater detail hereinafter with reference to FIG. 1. At this time, the switching valve 8 is in a closed position (indicated by solid lines in the drawing). In FIG. 1, when pressure upstream of the switching valve 8 is taken to be P1, pressure between the switching valve 8 and the upstream-side position of the honeycomb body 12 is taken to be P3, and pressure of the exhaust pipe 7 is taken to be P2, pressure in the exhaust pipes 3 and 7 with exhaust-gas flow is higher in portions closer to the engine 1, and so P1>p2.

Moreover, because gas flow within the honeycomb body 12 is exceedingly small in comparison with the flow in the exhaust pipes 3 and 7, the pressure differential is also exceedingly small. That is to say, substantially P2=P3. Consequently, because the pressure relationship before and after the switching valve 8 becomes P1>P3, when the switching valve 8 is in a closed position (indicated by solid lines in the drawing), force is applied to the switching valve 8 in the valve closed direction due to the foregoing pressure relationship, and so the switching valve 8 exhibits self-closing operation. Consequently, leakage of separated HC to the exhaust pipes can be prevented with still greater reliability.

Furthermore, because the amount of adsorbed HC is larger the further upstream of the honeycomb body 12, high-concentration separated HC can be refluxed in a single pass by connecting recirculation passages 10 and 14 with the upstream of the honeycomb body 12, and the time required for HC separation can be shortened.

Figure 2:
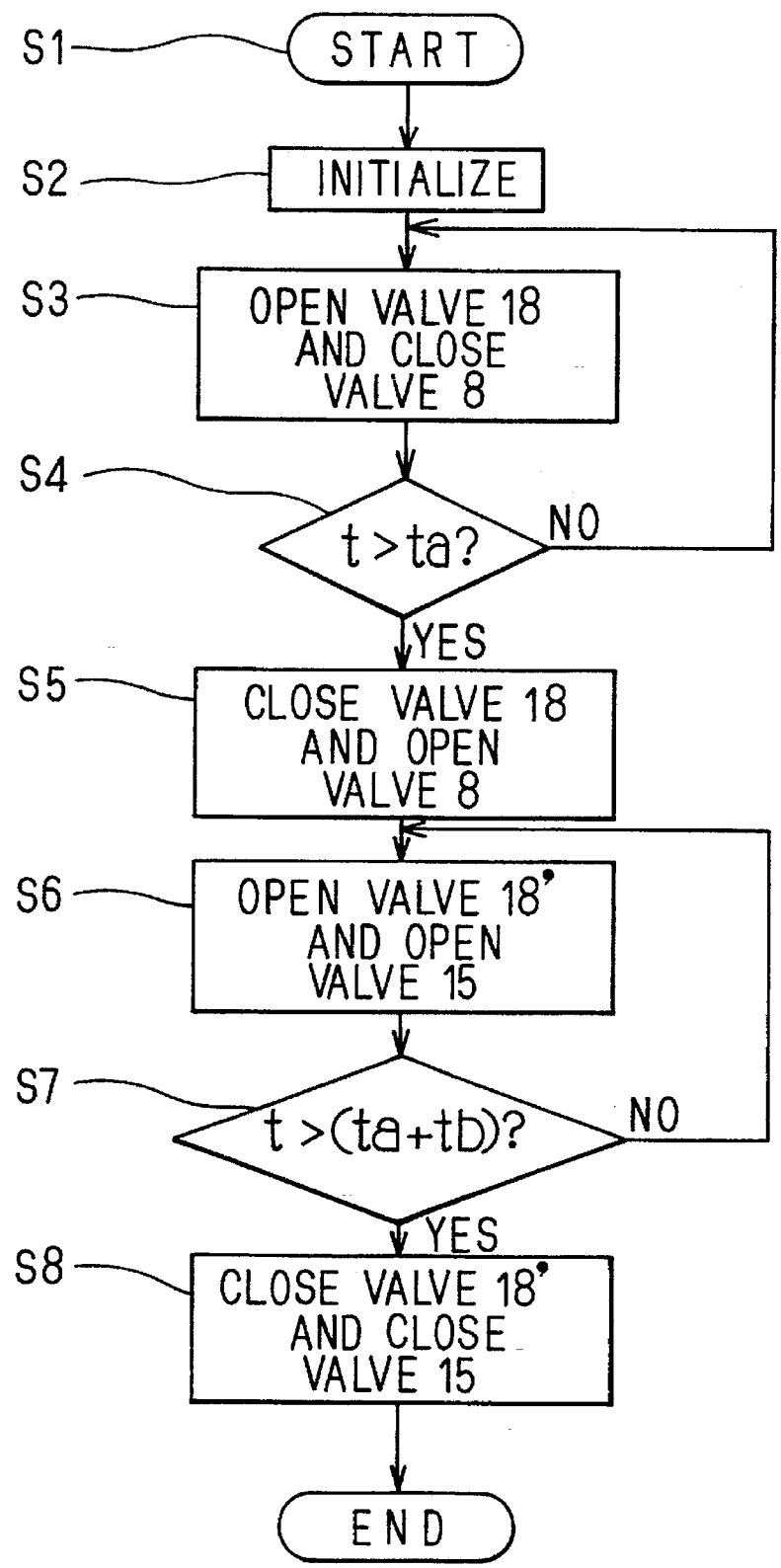
FIG. 2 is a flowchart describing a mode of operation of the apparatus in FIG. 1.

Accordingly, after the switching valve 8 has been switched to a closed position (indicated by solid lines in the drawing) and the HC separation and purification stroke has been entered, when the time in which separation of HC is completed (tb) elapses (t>[ta+tb]), the decision at S7 in FIG. 2 becomes YES, and execution passes to S8. In S8, the solenoid valve 18' is closed by a signal from the control unit 19, and so the interval between the recirculation passages 10 and 14 is closed.

According to the above-described embodiment, determination of whether elapsed time t after engine starting has exceeded a predetermined time ta is made at S4 in FIG. 2, but because this predetermined time ta is to estimate whether a condition in which separation of noxious components adsorbed on the adsorbent has been reached following starting of the engine 1, instead of determining the elapsed time t after engine starting, it is also acceptable to use a temperature sensor to detect the temperature of exhaust gas flowing into the honeycomb body 12 carrying the adsorbent and perform determination of whether the predetermined temperature has been reached based on defected temperature. In this case, it is acceptable to install the temperature sensor in a location immediately upstream of the switching valve 8.

Additionally, because the installation location of the honeycomb body 12 carrying adsorbent is on a downstream side considerably distant from the catalyst device 4 (approximately 2 to 3 m) and the exhaust gas temperature drops by a certain extent, it is possible to set the occurrence of the HC-separation starting temperature (approximately 100° C. to 200° C. in a case of hydrophobic zeolite) of the adsorbent and the catalyst-activation temperature (350° C. or more) of the catalyst device 4 to be essentially identical times after engine starting.

Figure 3:
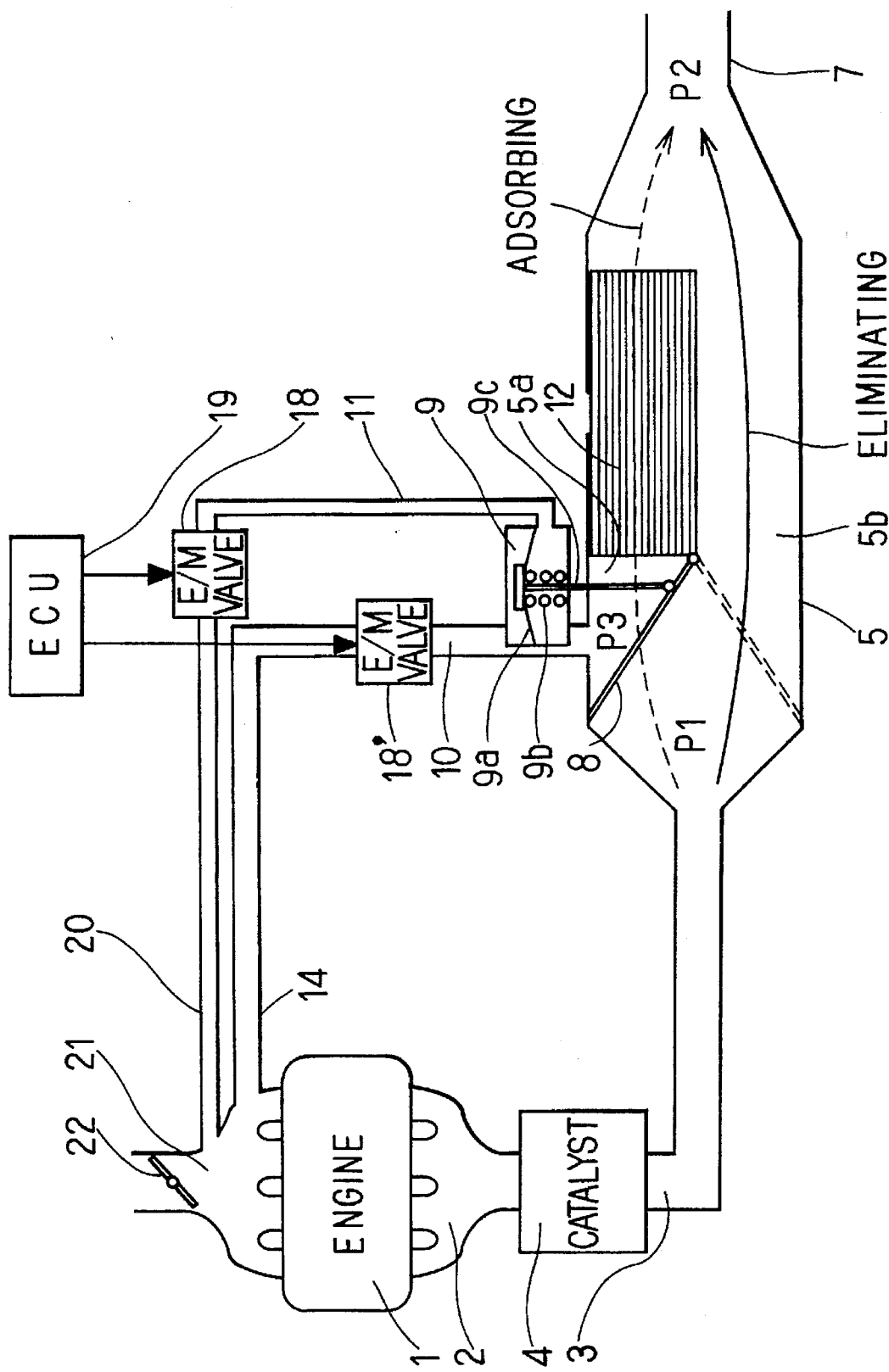
FIG. 3 is an overall system structural diagram of an exhaust-emission purification apparatus according to another embodiment of the present invention.

FIG. 3 indicates another embodiment according to the present invention. In this embodiment, a recirculation passage 14 is connected to an intake manifold 21 of an engine 1 so that separation components from the adsorbent to pass through recirculation passages 10 and 14 and are refluxed upstream of a catalyst device 4 by engine intake vacuum. According to the second embodiment, the one-way valve 16 in FIG. 1 can be eliminated.

Additionally, according to the foregoing description of a mode of operation, the solenoid valve 18' was placed in a valve-closed state and the switch valve 15 was opened after engine starting, but characteristics according to the present invention can be demonstrated even when the switch valve 15 is opened after engine starting.

The present invention has been described in connection with what are presently considered to be the most practical and preferred embodiments. However, the invention is not meant to be limited to the disclosed embodiments, but rather is intended to include all modifications and alternative arrangements included within the spirit and scope of the appended claims.

What is claimed is:

1. An exhaust purification apparatus for an engine having an intake manifold at an upstream side thereof and an exhaust manifold at a downstream side thereof comprising:

a catalytic converter having an upstream side adapted to be connected to said exhaust manifold;

an adsorption device, including an adsorbent structure body adsorbing exhaust gas components and a bypass passage, having an upstream side connected to a downstream side of said catalytic converter;

a switching valve disposed only at an upstream of said adsorbent structure body and an upstream end of said bypass passage, for selectively directing exhaust gas from said catalytic converter to one of said adsorbent structure body and said bypass passage;

a recirculation passage adapted to be connected to one of said manifolds and a point between said switching valve and an upstream side of said adsorbent body;

a recirculation valve which opens said recirculation passage when said switching valve directs said exhaust gas to said bypass passage, to thereby establish a path for recirculating said components from said adsorbent structure body to said one of said manifolds through a downstream side of said adsorbent structure body, said upstream side of said adsorbent structure body, said point and said recirculation passage, in sequence; and control means for controlling said switching valve and said recirculation valve.

2. The apparatus of claim 1, wherein said recirculation valve is adapted to connect said exhaust manifold to said point between said switching valve and said upstream side of said adsorbent structure body.

3. The apparatus of claim 1, wherein said recirculation valve includes a one-way valve permitting gas to flow therethrough only from said point toward said exhaust manifold.

4. The apparatus of claim 1, wherein said recirculation valve is adapted to connect said intake manifold to said point between said switching valve and said upstream side of said adsorbent structure body.

5. The apparatus of claim 1, further comprising:

a first air intake valve selectively connecting said intake manifold to said switching valve responsive to said control means, said switching valve being responsive to a pressure level of said intake manifold; and a second air intake valve selectively connecting said intake manifold to said recirculation valve responsive to said control means, said recirculation valve being responsive to said intake manifold pressure level.

6. The apparatus of claim 1, wherein said adsorbent structure body and said bypass passage are in thermal contact with one another, so that heat from exhaust gas passing through said bypass passage is imparted to said adsorbent structure body.

7. The apparatus of claim 1, wherein said control means is for, during a startup period, controlling said switching valve to pass exhaust gas from said engine through said adsorption structure body and controlling said recirculation valve to disconnect said point from said one manifold, and during a running period, controlling said switching valve to pass exhaust gas from said engine through said bypass passage and controlling said recirculation valve to connect said point to said one manifold to thereby establish said path.

8. The apparatus of claim 7, wherein said control means includes a timer measuring a predetermined time period corresponding to a time when separation of gas components adsorbed by said adsorbent structure body begins, thereby signifying a beginning of said running period.

9. The apparatus of claim 7, wherein said control means includes a temperature sensor measuring a predetermined temperature of exhaust gas upstream of said adsorbent structure body, said temperature being a temperature at which separation of gas components adsorbed by said adsorbent structure beings, thereby signifying a beginning of said running period.

10. The apparatus of claim 1, wherein said adsorbent structure body includes a honeycomb body carrying an adsorbent.

11. The apparatus of claim 10, wherein said honeycomb body includes cordierite and said adsorbent is hydrophobic zeolite.

12. The apparatus of claim 1, wherein said switching valve is disposed only on an upstream side of said adsorbent structure body.

13. The apparatus of claim 1, further comprising an auxiliary switching valve disposed, downstream of said adsorbent structure body and said bypass passage, for selectively directing exhaust gas in tandem with said switching valve.

14. The apparatus of claim 1, wherein:

said adsorption device further includes a casing;

said adsorbent structure body is located inside of said casing; and said bypass passage is located inside of said casing along said adsorbent structure body and keeps thermal contact with said adsorbent structure body in such a manner that heat of exhaust gas in said bypass passage is conducted to said adsorbent structure body.

15. An exhaust purification apparatus comprising:

an engine having an intake manifold at an upstream side thereof and an exhaust manifold at a downstream side thereof;

a catalytic converter connected to a downstream side of said exhaust manifold;

an adsorption device, including an adsorbent structure body adsorbing hydrocarbon in exhaust gas components and a bypass passage, having an upstream side connected to a downstream side of said catalytic converter;

a recirculation passage having a first end connected to one of said manifolds and a second end connected to an upstream side of said adsorbent structure body;

means for selectively directing said exhaust gas to said adsorbent structure body when a temperature of said exhaust gas is lower than a predetermined level and to said bypass passage when said temperature of said exhaust gas is higher than said predetermined level, provided at an upstream of said adsorbent structure body and said bypass passage; and means for recirculating hydrocarbon adsorbed by said adsorbent structure body from said upstream side of said adsorbent structure body to said one of said manifolds through said recirculation passage by an exhaust-gas pulsation produced in said exhaust manifold or an engine intake vacuum produced in said intake manifold when said directing means selectively directs said exhaust gas to said bypass passage.

16. The apparatus of claim 15, wherein said recirculation means includes a valve apparatus which is opened or closed according to a driving condition of said engine.

17. The apparatus of claim 15, wherein said second end of said recirculation passage is connected to a space between said upstream side of said adsorbent structure body and said directing means under the condition that said upstream side of said adsorbent structure body is closed by said directing means when said directing means directs said exhaust gas to said bypass passage.

18. An exhaust purification apparatus for an engine having an intake manifold and an exhaust manifold comprising:

a catalytic converter adapted to be connected to a downstream side of said exhaust manifold;

a casing having an upstream end connected to a downstream of said catalytic converter;

an adsorbent structure body, provided in said casing, for adsorbing hydrocarbon in exhaust gas emitted by said engine;

a bypass passage formed parallel with said adsorbent structure body in said casing;

a recirculation passage having a first end adapted to be connected to one of said manifolds and a second end connected to an upstream side of said adsorbent structure body for recirculating adsorbed hydrocarbon from said adsorbent structure body to one of said manifolds; and means for selectively directing said exhaust gas to said adsorbent structure body when a temperature of said exhaust gas is lower than a predetermined level and to said bypass passage when said temperature of said exhaust gas is higher than said predetermined level, said directing means provided at said upstream side of said adsorbent structure body and said bypass passage to form a space at said lower temperature between said directing means and said upstream side of said body in such a manner that said adsorbed hydrocarbon is recirculated to said one of said manifolds through said space and said recirculation passage when said directing means directs said exhaust gas to said bypass passage.

* * * * *